May 14, 1929.                C. A. MATSON                1,713,391
                         AUTOMATIC REVERSE BRAKE
                         Filed May 12, 1927         2 Sheets-Sheet 1
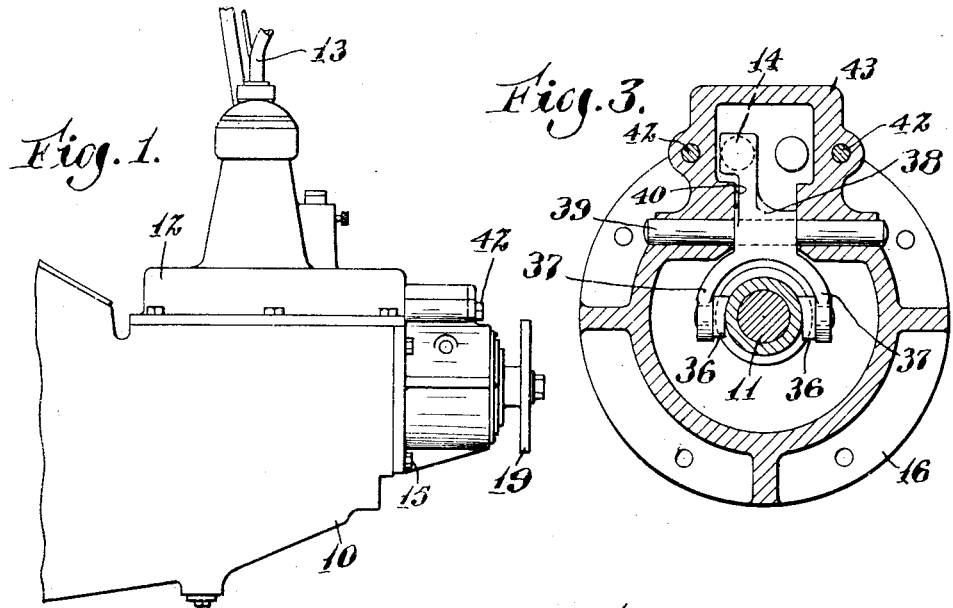
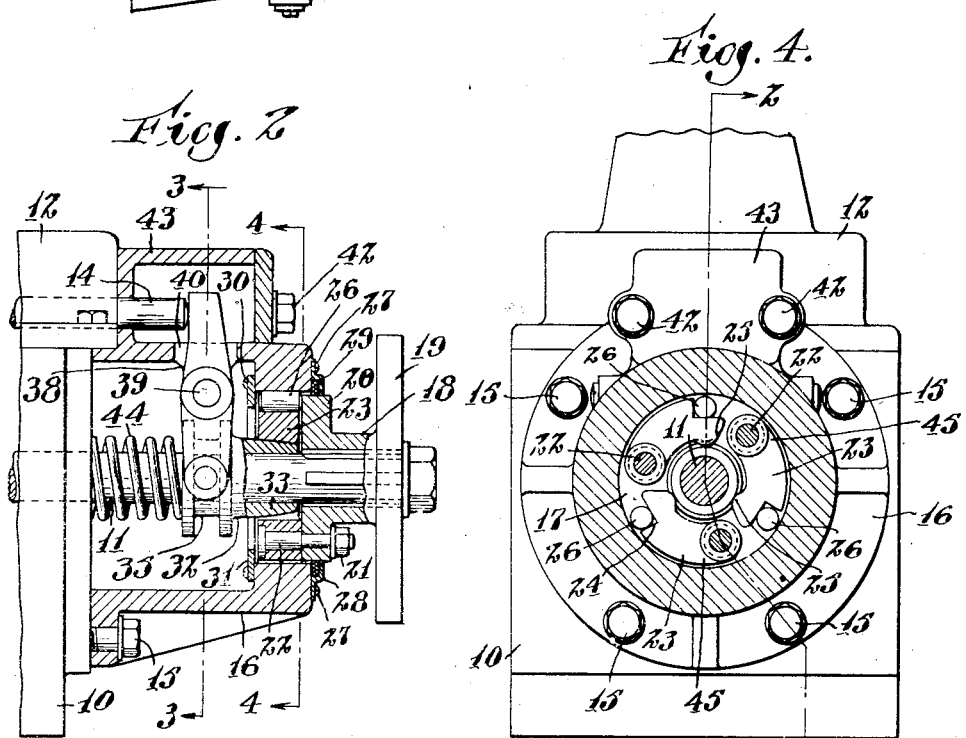
Inventor
Carl A. Matson
by James R. Hodder
Attorney

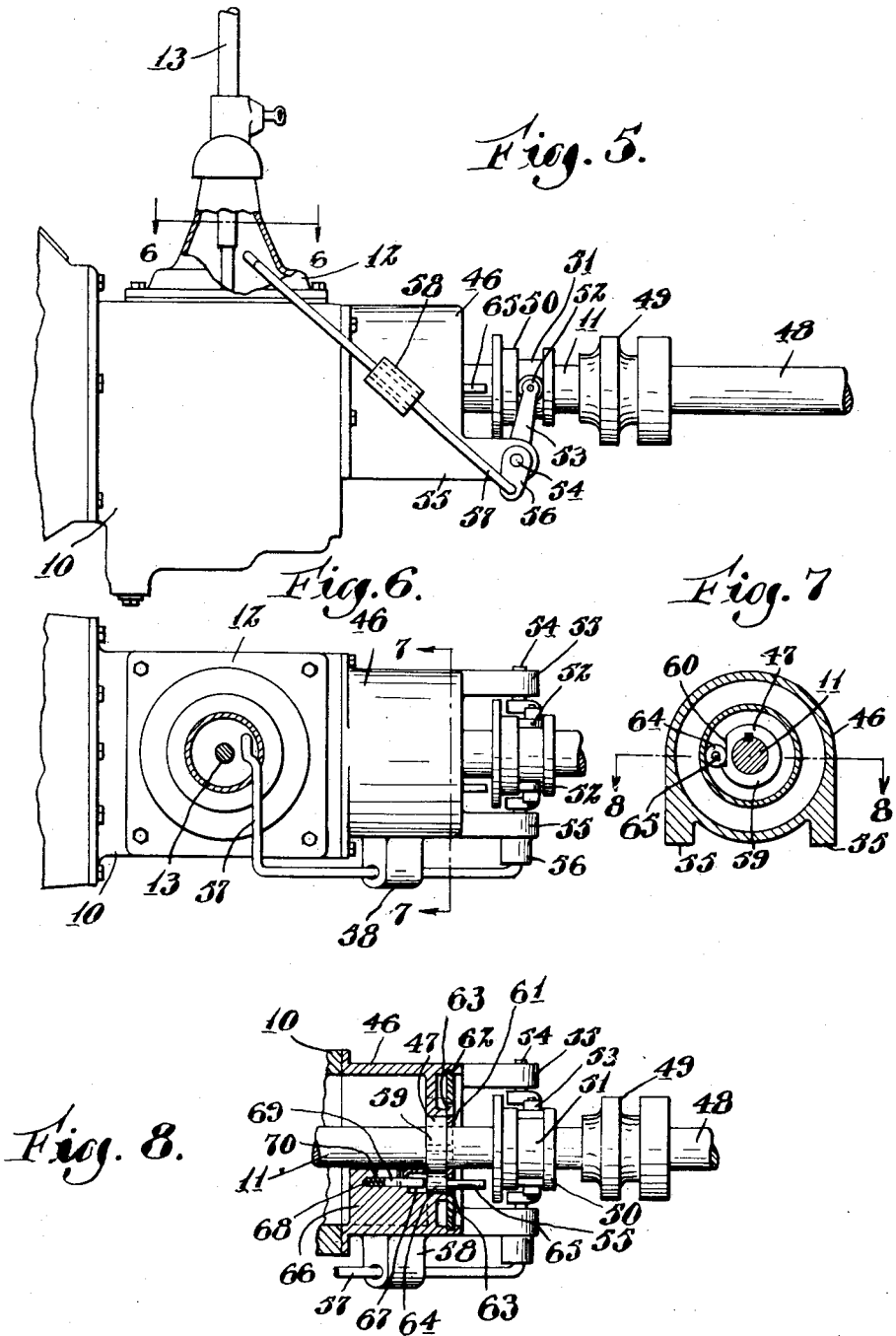

Patented May 14, 1929.

1,713,391

UNITED STATES PATENT OFFICE.

CARL A. MATSON, OF LYNNFIELD, MASSACHUSETTS.

AUTOMATIC REVERSE BRAKE. REISSUED

Application filed May 12, 1927. Serial No. 190,754.

My present invention relates to braking mechanism and more particularly to an improved automatic reverse brake for automobiles or other motor driven vehicles.

In the persent day automobile, a serious difficulty arises when it is necessary to start the vehicle in motion after having it stopped on an upgrade, and particularly if, in this situation, there is considerable traffic with another vehicle in close proximity at the rear. If the driver releases the foot brake to accelerate the engine prior to letting in the clutch, the vehicle will invariably roll backward and a possible accident to the car in the rear may result. The only way in which the car can be started under these conditions is to set the emergency brake, release the foot brake, accelerate the engine, let in the clutch, and gradually let out or release the emergency brake. This operation requires considerable skill and is not always feasible.

In my present invention, I have devised means for obviating this difficulty and have associated with the propeller shaft or transmission, or both, of the vehicle, an automatic release clutch which automatically sets when the car moves backward, unless the moving backward is premeditated by operating the reverse mechanism. The automatic reverse brake is always operable under normal conditions but may be thrown out of action entirely when the car is put into reverse.

The object of my invention, therefore, is an improved automatic brake mechanism for automobiles and like vehicles.

In the accompanying drawings illustrating preferred embodiments of my invention, Fig. 1 is a side elevation of a transmission case of an automobile with my invention associated therewith;

Fig. 2 is a central longitudinal section through the reverse brake mechanism of Fig. 1;

Fig. 3 is a sectional elevation on the line 3—3 of Fig. 2;

Fig. 4 is a sectional elevation on the line 4—4 of Fig. 2;

Fig. 5 is a side elevation of a transmission casing with my invention attached thereto, the invention being a modified form of that illustrated in Figs. 1 to 4 inclusive;

Fig. 6 is a plan view of Fig. 5 with a portion thereof in section on the line 6—6 of Fig. 5;

Fig. 7 is a section on the line 7—7 of Fig. 6, and

Fig. 8 is a sectional plan view on the line 8—8 of Fig. 7.

Referring to the drawings, and more particularly to Figs. 1 to 4 inclusive, 10 designates a transmission casing carrying the usual transmission gearing, and having rotatably mounted therein and extending through the rear end thereof a transmission shaft 11.

Mounted on top of the transmission casing 10 is a cover 12 in which is pivotally mounted the control lever 13 for operating the slide rods 14 associated with the change gearing within the casing 10. Attached to the rear of the transmission casing 10 by bolts 15 is a casing 16, such casing being bored to any suitable diameter, as indicated at 17, concentric with the transmission shaft 11, which transmission shaft extends outward through such boring 17 and has attached thereto a hub 18, provided at its outer end with a flange 19 for association with a universal joint (not shown) for connecting the same to the usual propeller shaft, also not shown. On the inner end of the hub 18 is formed a flange 20, to which is secured by nuts 21, stub shafts 22, of any desired number, and equally spaced about the flange 18 and lying parallel to each other and the transmission shaft 11. Freely pivoted on each of the stub shafts 22 are arcuate members 23, which members are provided on their outer free ends with wedge-shaped cut-away portions 24, such outer free ends being rounded, as indicated at 25. As shown in Figs. 2 and 4, the arcuate members 23 lie within the bored portion 17 and the interior surface of such bored portion 17, together with the wedge-shaped cut-away portion 24 in the arcuate members 23, act as recesses in which are loosely fitted rollers 26. Secured on the outer end of the casing 16, by screws 27, is a cover member 28, clamping against the outer face of the casing 16 and the periphery of the flange 18 is a dust excluding pad 29. The outer end of the rollers 26 engage with the outer surface of the flange 18, which flange, therefore, prevents the roller 26 from moving outwardly with respect to the casing 16. Secured to the inner face of the casing 16 by screws 30 is an annular plate 31 and which may be engaged by the ends of the rollers 26 to thereby prevent such rollers from moving inwardly with respect to the casing 16. Slidably and rotatably mounted on the transmission shaft 11 is a sleeve 32 tapered at its outer end, as indicated by the numeral 33, and which tapered end is in engagement with rounded ends 25 of the arcuate members 34, and which tapered end acts to force the free ends of the arcuate members 23 outward about their pivot stub shafts 22. The inner end of the sleeve 33 has formed thereon an annular groove 35 in which fits members 36 pivotally secured to the outer ends of forked arms 37, such forked arms being formed on a lever 38 pivotally mounted on a transverse shaft 39 in the casing 16 and above the transmission shaft 11. The other end of the lever 38 passes through a hole 40 in the upper wall of the casing 16. Secured to the upper wall of the casing 16 by bolts 41 and to the rear end of the cover 13 by bolts 42 is a hollow box or casing 43 and into which the rear ends of the members 14 and the upper end of the lever 38 extend. As shown in Figs. 2 and 3, the upper end of the lever 38 is in alinement with the left-hand member 14 and which is assumed to be the member associated with the reverse gears contained in the transmission casing 10.

Between the outer end of the casing 10 and the end of the sleeve 32, while surrounding the transmission shaft 11, is a coil spring 44 which tends to rotate the lever 38 about the shaft 39 in an anti-clockwise direction and to thus force the tapered end 33 of the sleeve 32 to the right, as shown in Fig. 2, to thereby force the free ends of the arcuate members 23 about their pivot shafts 22 in an anti-clockwise direction and thus bring the free end into close association with the inner surface of the bored portion 17 of the casing 16, in this manner reducing the size of the space in which the rollers 26 are located.

If we assume that the device has been constructed and assembled as above described and that the automobile with which the device is associated has been stopped on an up-grade, the transmission shaft 11 will have a tendency to rotate in an anti-clockwise direction, as viewed in the figures, and will cause the arcuate members 23 to roll away from their associated rollers 26, which will thus be clamped between the wedge-shaped stubs 24 and the inner surface of the bored portion 17. Such clamping action will result in the prevention of rotation of the transmission shaft 11 and, therefore, the automobile on which it is mounted will be prevented from moving backward. Under such conditions it is obvious that neither the emergency brake nor the foot brake of the automobile need be set and that the operator of the vehicle may devote his entire attention to the engine and clutch when he desires to start the car, as the clockwise rotation of the transmission shaft 11 will result in releasing the rollers 26 from their clamped position. Should the operator desire to reverse the gear therein when the same is on the upgrade or on the level, he will naturally operate the control lever 13 so as to put the reverse gears (not shown) into operative position and in doing so, the members 14 will engage with the upper end of the lever 38, rotating the same in a clockwise direction about its shaft 39. The forked ends 37 carrying the members 36 that engage in the annular groove 35 of the sleeve 32 will move such sleeve to the left, as viewed in Fig. 2, comprising the spring 44 and thus withdrawing the tapered end 33 of said sleeve 32 from engagement with the rounded ends 25 of the arcuate members 23. Associated with each of the arcuate members 23 is a spring 45, which tends to rotate the arcuate members 23 in a clockwise direction about the stub shafts 22 and, therefore, the withdrawing of the tapered end 33 of the sleeve 32 will allow the springs 45 to move the free ends of the arcuate members 23 inwardly, thus enlarging the space for the rollers 26 that is formed by the cut-away portion 24 of the arcuate members 23 and the inner wall of the bored portion 17. Under these conditions, therefore, the clutching action of the rollers 26 is prevented, and the transmission shaft 11, as well as the propeller shaft (not shown) associated therewith may freely rotate in the reverse direction.

With this modification of my invention, therefore, I am enabled to prevent reverse rotation of the transmission shaft 11 under ordinary conditions and may permit such rotation whenever desired.

Referring now to Figs. 5 to 8 inclusive, which show a modified form of my invention, the transmission case 10 containing the transmission gears has mounted thereon a cover plate 12, in which is rotatably mounted the operating lever 13. Secured to the rear of such transmission casing 10 is a casing 46 bored at its rear end at 47 to allow passage therethrough of the transmission shaft 11, forming part of the gear system in the casing 10. The transmission shaft 11 is associated with a propeller shaft 48 by means of the usual universal joint 49 and between the universal joint 49 and the rear of the casing 46 on the transmission shaft 11 is rotatably and slidably mounted a sleeve 50, such sleeve being provided with an annular groove 51 in which is mounted rollers 52 carried on the ends of forked arms 53. The forked arms 53 are secured to a shaft 54 that is rotatably mounted in projecting lugs or ears 55, formed integrally with and extending rearwardly from the casing 46. Also secured to one end of the shaft 54 is a crank arm 56 having pivotally mounted at its free end the front end of a rod or shaft 57. This rod or shaft 57 passes upwardly or forwardly and its upper end is at right angles to the main portion thereof, such right-angled portion extending through a perforation in the cover 12 and terminates in the rear of the lower end of the operating lever 13. Formed integral with the casing 46 at one side thereof is a member 58, through which the operating rod or shaft 57 passes and which serves to guide the same. Keyed to the transmission shaft 11 and in close association with the bored portion 47 of the casing 46 is a sleeve 59 provided with a cut-away portion 60, as clearly shown in Fig. 7. Secured to the rear face of the sleeve 59 in any suitable manner is a disc 61. Secured in the annular groove in the casing 46 is an annular plate 62, this plate 62 lying in practically the same plane as the disc 61. The inner diameter of the annular plate 62 is considerably greater than the outer diameter of the disc 61 and such members, when in position, form an annular passage 63 therebetween. Associated with the bored portion 47 of the casing 46 and with the sleeve 59 is a locking roll 64 which is substantially equal in length to the width of the sleeve 59, and such locking roll 64 has formed thereon and in axial alinement therewith a projecting portion 65 of less diameter than the roller 64 and also of considerably less diameter than the width of the annular groove 63. Such groove 63 will, therefore, allow radial movement of both the members 65 and the locking roll 64. The cut-away portion 60 of the sleeve 59 with the bored portion 47 of the casing 46 forms a wedging space or diameter for the locking roll 64 so that, referring to Fig. 7, if the transmission shaft 11 is rotated in an anti-clockwise direction, it is obvious that the locking roll 64 will be gripped between the cut-away portion 60 of the sleeve 59 and the bored portion 47 of the casing 46, thereby locking such transmission shaft 11 against anti-clockwise rotation. Thus the bored portion 47, the locking roll 64 and the cut-away portion 60 of the sleeve 59 act as a locking device or brake for preventing anti-clockwise rotation of the transmission shaft 11. On the inner side of the casing 46 is formed a solid portion 66 which is recessed at 67 to a depth and diameter slightly greater than the length and diameter of the locking roll 64 and into which such locking roll may be forced. In alinement with the counter-bored portion 67 is a passage 68 in which is slidably mounted a pin 69, a spring 70 being also located in the passage 68 and between the end of the pin 69 and the bottom of the passage 68, such spring 70 urging the pin 69 outward or to the right, as viewed in Fig. 8, a stop pin being provided for preventing too far outward movement of such pin 69. The outer end of the member 65 is adapted to be engaged by the rear of the sleeve 50 and as the transmission shaft 11 rotates, carrying the sleeve 59 and therefore the locking roll 64 therewith, it is obvious that if the sleeve 59 is moved to the left, as shown in Fig. 8, that such sleeve 50 will engage with the end of the member 65 and when the locking roll 64 comes into alinement with the counter-bored portion 67, such locking roll may be forced into the counter-bored portion and out of engagement with the sleeve 59 and counter-bored portion 47. Suitable means may be associated with the forked members 53 for yieldingly holding the same in normal or inoperative position.

In this modification of my invention, if we assume that the automobile or other vehicle to which the device is attached has been stopped on an upgrade, that should such vehicle move backward, it will rotate the transmission shaft 11 in an anti-clockwise direction, which will clamp the locking roll 64 between the cut-away portion 60 of the sleeve 59 and the bored portion 47 of the casing 46, thereby locking such transmission shaft 11 against anti-clockwise rotation and effectually preventing retrograde motion of the vehicle to which the same may be attached. If, however, it is desired to allow the vehicle to roll backward or to positively move the vehicle backward, the operator, by properly manipulating the lever 13, moves the transmission gears (not shown) in the casing 10 into position to rotate the transmission shaft 11 in an anti-clockwise direction, and in doing so, will cause the lower end of said lever 13 to engage with the upper right-angled portion of the rod or shaft 57, which will thereupon move downward or to the right, as viewed in Fig. 5, rotating the shaft 54, and through the forked members 53 and rolls 52, moving the sleeve 50 to the left, as viewed in Figs. 5 and 8. This action causes the sleeve 50 to engage with the end of the rod 65 and when the transmission shaft 11 rotates so as to bring the locking roll 64 into alinement with the counter-bored portion 67, pressure on the sleeve 50 will force the locking roll 64 out of engagement with the sleeve 59 and the counter-bored portion 47 and the transmission shaft 11 will, therefore, be free to rotate in an anti-clockwise direction.

While I have necessarily shown and described the preferred embodiments of my invention somewhat in detail, it is to be understood that I may vary the size, shape, and arrangement of parts within wide limits without departing from the spirit of the invention.

Having thus described my invention, what I claim as new is:

1. In an improved reverse brake for automobiles and the like, the combination of a driven member, a stationary member concentrically arranged with respect thereto, a braking clutch associated with the driven member for preventing rotation of such driven member in one direction, and means operable at will for putting the automatic braking mechanism out of action to thereby permit rotation of the driven member in either direction.

2. In an improved automatic reversing clutch for automobiles and the like, the combination of a driven shaft, a plurality of operable locking members mounted thereon and rotatable therewith, a stationary enclosing member concentrically mounted with respect to said driven shaft and said operable members, locking devices associated with the operable members and the stationary enclosing case for preventing rotation of the driven shaft in one direction.

3. In an improved automatic reversing clutch for automobiles and the like, the combination of a driven shaft, a plurality of operable locking members mounted thereon and rotatable therewith, a stationary enclosing member concentrically mounted with respect to said driven shaft and said operable members, locking devices associated with the operable members and the stationary enclosing case for preventing rotation of the driven shaft in one direction, and means associated with said operable members for putting the locking or braking members out of action to thereby permit rotation of the driven member in either direction.

4. In an improved automatic reverse brake for automobiles and the like, the combination of a driven member, a brake device associated therewith, comprising a plurality of pivotally mounted braking members rotatable with the driven member, an enclosing casing concentrically arranged with respect to the driven member and associated with the braking members, locking rollers associated with the braking members and the enclosing casing, means slidably mounted on the driven member and normally holding the braking members in operative relation to the locking rollers and enclosing casing, and means operated by the reverse gearing of the automobile for moving the braking members and the locking rollers out of operative association with each other to thereby permit rotation of the driven member in the reverse direction.

5. In an improved automatic reverse brake for automobiles and the like, the combination of a driven shaft, a locking element, an abutting member associated with the locking element, a wedging member permitting moving of the locking element into and out of operative relation with respect to the abutting member, and means for moving and holding the wedging member in operative relation with respect to the locking element.

6. In an improved automatic reverse brake for automobiles and the like, the combination with a transmission, including a driven shaft, an enclosing casing for the transmission, an auxiliary enclosing casing attached to the transmission casing, a locking element mounted in the auxiliary casing, an abutting member associated with the locking element, a wedging member permitting moving of the locking element into and out of operative relation with respect to the abutting member, and means for moving and holding the wedging member in operative relation with respect to the locking element.

In testimony whereof, I have signed my name to this specification.

CARL A. MATSON.